United States Patent [19]

Pask

[11] 3,906,710
[45] Sept. 23, 1975

[54] HEIGHT-OF-CUT CONTROL FOR A CROP HARVESTING IMPLEMENT

[75] Inventor: Glen S. Pask, Saskatoon, Canada

[73] Assignee: Canadian Patents and Development Limited, Ottawa, Canada

[22] Filed: Mar. 25, 1974

[21] Appl. No.: 454,747

[52] U.S. Cl. ............... 56/10.2; 56/208; 56/DIG. 15
[51] Int. Cl.² .......................................... A01D 75/14
[58] Field of Search............ 56/208, DIG. 15, 10.2, 56/10.4

[56] References Cited
UNITED STATES PATENTS
3,398,516  8/1968  Quick ................................... 56/208
FOREIGN PATENTS OR APPLICATIONS
778,092  2/1968  Canada............................... 56/10.2

Primary Examiner—J. N. Eskovitz
Attorney, Agent, or Firm—Ronald G. Bitner

[57] ABSTRACT

An automatic height-of-cut control for a crop harvesting implement such as a swather comprising a sensor disposed behind the cutting bar for indicating the cut crop material length. In one embodiment the sensor is positioned by a cable and pulley mechanism in relation to the cutting bar height such that for every position of the cutting bar there is a corresponding sensor position providing a preselected stubble to crop height ratio. A controller filters the sensor output which positions an electrohydraulic valve to either raise, lower or maintain the swather table by means of a hydraulic actuator. Additional means provide maximum and minimum stubble height, and override means for manual operation.

9 Claims, 7 Drawing Figures

HEIGHT-OF-CUT CONTROL FOR A CROP HARVESTING IMPLEMENT

BACKGROUND OF THE INVENTION

This invention relates to an automatic height-of-cut control for a crop harvesting implement and particularly for a swather or windrower.

Swathing or windrowing is an important step in the harvesting operation of many cereal crops. The swathing process reduces the risk of crop damage and grain losses caused by the natural elements particularly unfavorable weather conditions during the final maturation stage of the crop.

The height of the standing grain may vary throughout a field due to variations in land contours, soil conditions, or drainage patterns. This variation in crop height requires a proportional variation in the stubble height or height-of-cut to obtain the minimum overall harvesting grain losses. With a long stubble holding the windrow off the ground, the grain dries faster and is easier to pick up with resultant lower combine pick-up losses. The shorter straw associated with long stubble means less material for the combine to thresh, thus better separation and lower grain losses. However, if the straw is too short, the windrow tends to settle through the stubble onto the ground due to weathering. The long stubble may also bend and allow the windrow to settle to the ground. This results in increased pick-up losses, dirt and stones in the threshed grain, or a loss of grain quality from soil moisture. A general rule is a stubble height of one-third of the crop height for average to heavy crops and one-quarter for thin straw-broken crops with a maximum stubble height of 12 inches. However, the actual proportion required for a particular field is dependent on the type of crop, crop density, stubble distribution and strength, width of the windrower and the anticipated weather conditions. With these factors in mind, the swather operator attempts to hydraulically adjust the cutter bar height in proportion to the crop height as it varies across the field. The operator, however, may not make the required adjustment due to poor judgment, inexperience, or fatigue. The result is a deterioration in the quality of the swathing operation and an increase in the grain losses.

An automatic height control is disclosed in Canadian Pat. No. 778,092 in which it is proposed that crop height sensing devices be mounted ahead of the cutting bar. A disadvantage of the previous device is that the forwardly mounted sensing devices and associated supporting structure interfere with crop flow. Furthermore the previous device requires a continuous ground follower and is susceptible to mechanical instability.

SUMMARY OF THE INVENTION

An object of the present invention is to provide control means for automatically adjusting the height of the cutting board of a crop harvesting implement in proportion to the crop height.

Another object is to automatically adjust the cutting bar to provide the optimum stubble height to crop height ratio in order to minimize grain losses.

Another object is to provide an automatic height-of-cut control with reduced interference to crop flow.

Another object is to provide a height-of-cut control which does not require a continuous ground follower.

The automatic height control of the present invention comprises sensing means disposed behind the cutting bar of the crop harvesting implement for indicating the length of crop material cut by the cutting bar, means for sensing the position of the cutting bar to provide an indication of the stubble height and means for determining if the indicated stubble height corresponds with a preselected relationship to the indicated length of cut crop material. Means responsive to deviations from the preselected relationship adjusts the cutting bar to establish the preselected relationship.

In one specific embodiment of the invention the cut crop length sensing means is movably mounted, and means interconnecting the sensing unit and the cutting bar adjusts the distance of the sensing means from the cutting bar in response to changes in vertical position of the cutting bar relative to the implement in accordance with a predetermined relationship. The sensing means preferably comprises a first upper sensing element adapted to indicate if the cut crop length is greater than a predetermined value and a second lower sensing element adapted to indicate if the cut crop length is less than a predetermined value. Means are provided to raise the cutting bar when the first sensing element is activated and to lower the cutting bar when the second sensing element is not activated.

Additional means provide maximum and minimum stubble heights, means to prevent the cutting bar from contacting the ground, and override means for manual operation.

DESCRIPTION OF PREFERRED EMBODIMENTS

Figure 1:
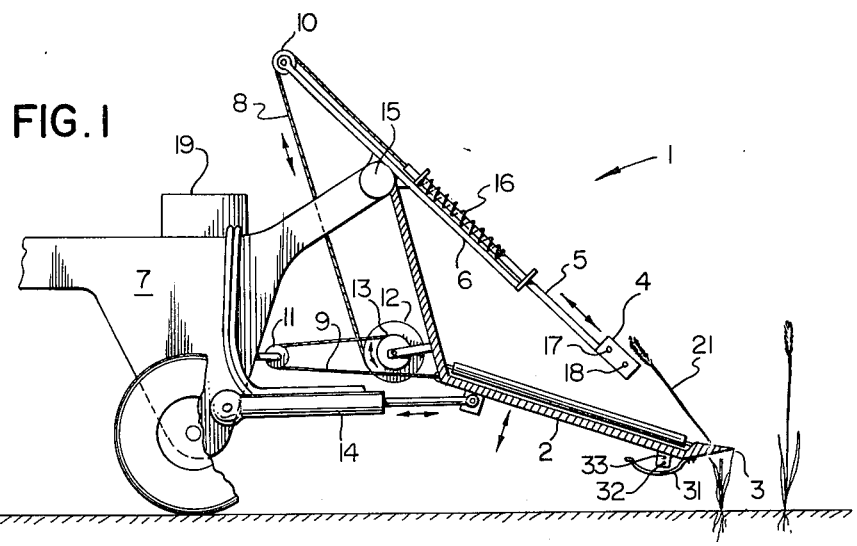
FIG. 1 is a fragmented partially sectional side view of a crop harvesting implement incorporating one embodiment of a height-of-cut control.
Figure 2:
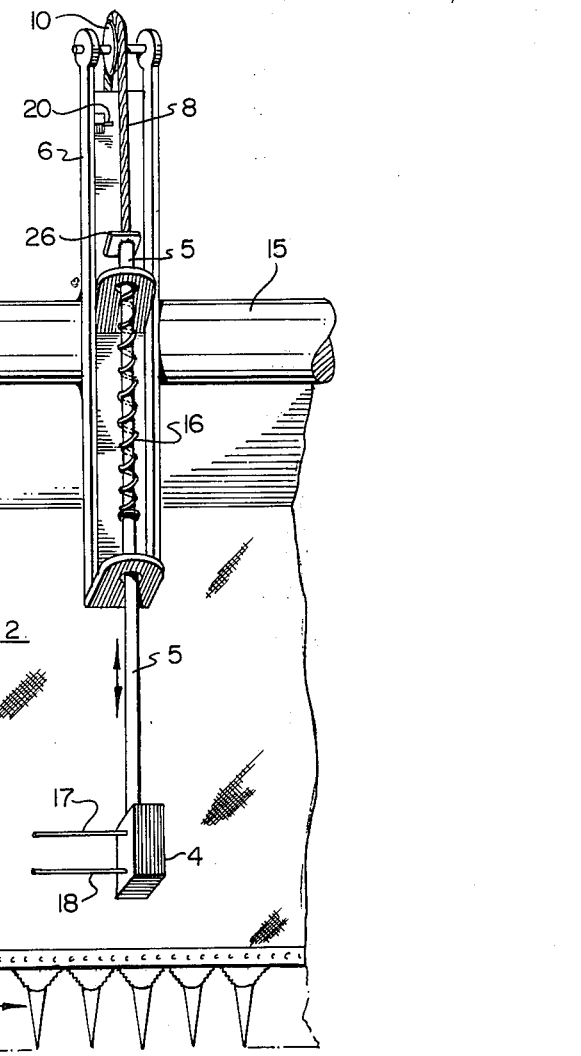
FIG. 2 is a frontal perspective view showing the cut crop length sensing unit of FIG. 1 enlarged.

FIGS. 1 and 2 illustrate one embodiment of the invention associated with a swather 1 which comprises a table 2 with cutting bar 3 adjustably mounted on a frame 7. Behind the cutting bar 3 is a two-switch crop sensing unit 4 which indicates the length of crop material cut by the cutting bar 3. The sensing unit 4 is attached to a slider 5 which slides along slider frame 6.

The sensing unit 4 is positioned in relation to the cutting bar height by a mechanism which interconnects the table 2, the implement frame 7 and the sensing unit 4. The sensing unit positioning mechanism comprises cables 8 and 9, idler pulleys 10 and 11, and interconnected idler pulleys 12 and 13. When the hydraulic actuator 14 is extended, the table 2 is raised and pivots about 15. This increases the distance between the swather frame 7 and the table 2, unwinding some of the cable 9 off the pulley 13 turning it. Pulley 12 being connected with pulley 13 simultaneously winds cable 8 onto pulley 12 pulling the sensing unit 4 away from the cutting bar 3. The difference in size of pulleys 12 and 13 serves to multiply the small displacement produced by the table movement into the large displacement required by the sensing unit 4. This multiplication can be varied by the relative pulley sizes in order to obtain the desired stubble to height ratio. The crop length at zero cutting bar height can be adjusted by taking in or letting out the end of the cable 9 fixed to the table or similarly by adjusting the slider 5 relative to cable 8. The return spring 16 ensures that the sensing unit 4 returns to its designated position when the table is lowered.

It should be noted that the sensing unit is positioned with reference to the implement frame rather than directly to the ground beneath the cutting bar. The position of the table with respect to the frame provides an indirect and approximate indication of the cutting bar or stubble height. This arrangement eliminates the need for a continuous ground follower.

The sensing unit 4 comprises two lever actuated switches 17 and 18 which are actuated by falling cut crop 21. The switches are electrically connected with an electrohydraulic controller 19.

The cutting bar 3 is at the proper height when the falling crop actuates only the lower switch 18. If the crop falls on and depresses both switches, 17 and 18, this indicates that the cutting bar and sensing unit positions are too low in proportion to the crop height. Conversely if the crop does not strike either switch on falling, the cutter bar is too high. When a "too-high" or "too-low" signal is received by the controller 19, an electrohydraulic valve is actuated and the proper correction to the cutter bar height is made by means of the hydraulic actuator 14. At the same time the sensing unit is repositioned in order that the desired stubble height to crop height ratio is maintained.

To prevent the table 2 from being lowered onto the ground when the crop is very short, a ground proximity sensor is provided at either or both ends of the table. The sensor comprises a ground follower 31 and two switches 32 and 33. When the follower touches the ground, it actuates switch 32 which through the controller prevents further lowering of the table. If the ground surface moves the follower 31 further upward, switch 33 is activated causing the controller to raise the table.

In order to provide a maximum stubble height limit, an additional switch 20 may be located on the slider frame 6 to be actuated by the slider detent 26 at a position corresponding to the maximum desired stubble height. Activation of this switch is adapted to override the proportioning action.

Figure 3:
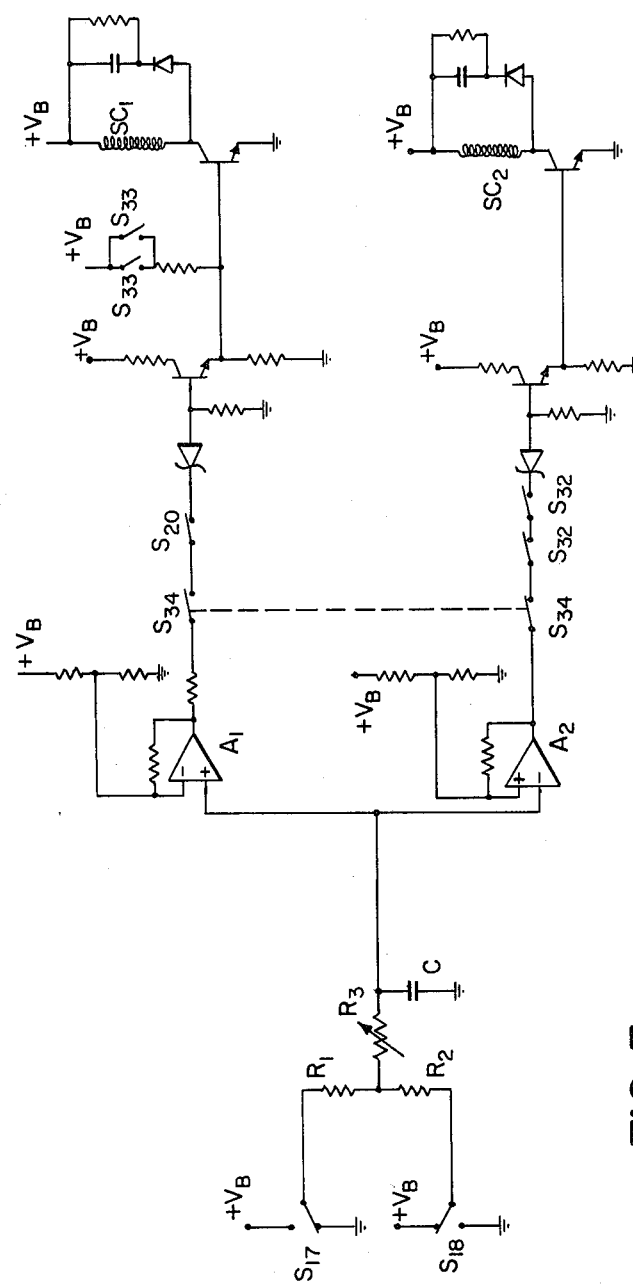
FIG. 3 is a schematic diagram of an electrical circuit for the height-of-cut control of FIGS. 1 and 2.

The electrical circuit of the controller is shown in FIG. 3. The electrical circuit in response to inputs from the crop sensing unit, the ground proximity sensors and a manual override switch, positions the electrohydraulic valve in one of three positions to either raise, lower, or maintain the cutting bar height. The circuit establishes the priorities of these inputs and interlocks them so that the valve is driven to only one position at a time. The output of the sensor switches is filtered to prevent unnecessary electrohydraulic valve action.

The crop height sensing switches $S_{17}$ and $S_{18}$ are shown in their positions for normal operation. Since $S_{17}$ is grounded and $S_{18}$ is at $+V_B$, the implement battery voltage, then the voltage on capacitor C is ½ $V_B$ due to the voltage dividing by the resistors $R_1$ and $R_2$. If $S_{17}$ is switched to $+V_B$, corresponding to the crop height increasing and striking both switches $S_{17}$ and $S_{18}$, charge flows through both resistors $R_1$ and $R_2$ and the variable resistor $R_3$ charging the capacitor C. This increase in charge increases the voltage level on the capacitor C. Similarly if $S_{18}$ is switched to ground, corresponding to a decreased crop height and not striking either switch $S_{17}$ or $S_{18}$, charge flows from the capacitor C lowering its voltage level. This capacitance and resistance network serves to filter the output of the crop height sensing switches. The variable resistor $R_3$ allows the time constant of the filter to be adjusted to provide the best combination of control system response without excessive mechanical and hydraulic action. The two operational amplifiers $A_1$ and $A_2$ and their resistance networks form voltage level comparators. The upper operational amplifier turns on when the voltage on the capacitor exceeds 77% of $V_B$. This signal is amplified and activates solenoid coil $SC_1$ of the electrohydraulic valve which raises the table. Conversely if the capacitor voltage drops below 23% of $V_B$, the lower operational amplifier turns on, activating solenoid coil $SC_2$ and the table lowers. Switch $S_{34}$ is a manual override switch which prevents the controller from responding to the crop height sensing unit. The two $S_{32}$ switches are the "prevent lowering" switches of the ground proximity sensors. The $S_{33}$ switches are the "must raise" switches in the ground proximity sensors which operate by turning on the second amplifier stage to the solenoid coil $SC_1$ causing the table to raise. Switch $S_{20}$ provides the maximum stubble height limit.

Figure 4:
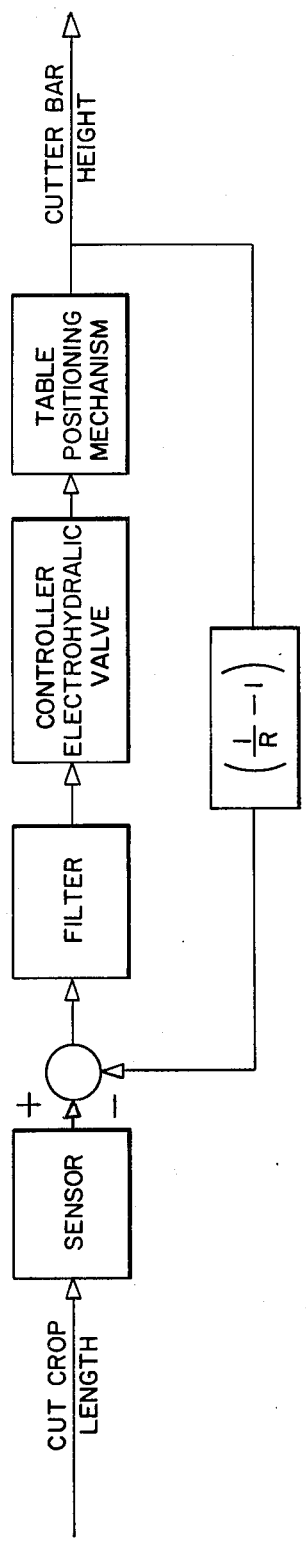
FIG. 4 is a block diagram illustrating the height-of-cut control system.

A block diagram of the automatic height-of-cut control system is illustrated in FIG. 4. As the swather cuts the standing crop, the crop height is divided into the cut material which falls to the table from above the cutter bar while the stubble remains standing below. In the previously described embodiment, the cut crop length is sensed and compared in relation to the stubble height by means of two-lever actuated switches and a sensor positioning mechanism which moves the sensor in relation to the cutter bar by the factor (1/R−1), where R is the preselected ratio of stubble height to crop height. In alternate embodiments to be described, the cut crop length is sensed directly. The stubble height is indicated by a measurement of the relative position of the table with respect to the swather frame. The indicated stubble height is multiplied by the same factor (1/R−1) and compared with the crop length electronically. The comparison, by either means, produces a signal which indicates the deviation from the preselected relationship. The signal is then filtered. The controller monitors this signal and responds to the deviations by actuating the electrohydraulic valve which, through the table positioning mechanism, changes the cutter bar position and corresponding stubble height to establish the preselected relationship.

Figure 5:
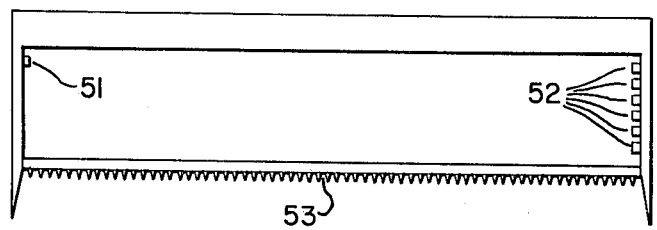
FIGS. 5 and 6 illustrate schematically alternate embodiments for indicating the cut crop material length.
Figure 6:
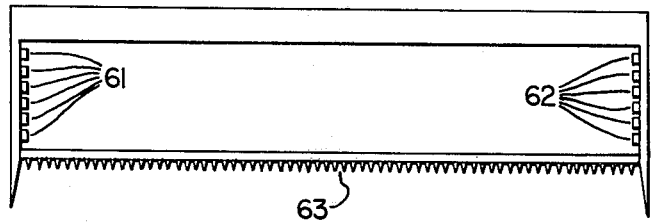

FIG. 5 and FIG. 6 illustrate alternate means for measuring the cut material length. Behind the cutter bars 53 and 63, respectively, on one side of the table are one or more transmitters 51 or 61, emitting acoustic or electromagnetic radiation for example, and on the other side are a series of receivers 52 and 62, respectively. Cut crop material falling across the path of the emitted signal interrupts its reception by one or more receivers. The number of receivers receiving interrupted signals provides an indication of the cut material length.

As previously indicated, the distance, or similarly the angle about pivot 15 in FIG. 1, between the lower rear of the swather table and the swather frame is proportional to the cutting bar position and approximately indicates the stubble height. A measure of the aforesaid distance or angle therefore indicates the cutter bar position or stubble height. This measurement may be made by a linear or rotary potentiometer. Electrical means may be employed to relate stubble height and cut material length to determine if the stubble height is in the preselected proportion of the crop height. The stubble height signal is electronically multiplied by the factor $(1/R-1)$ where R is the preselected ratio of stubble height to crop height, or alternatively the cut material length signal is divided by the same factor. The signals are compared and the comparison indicates if the stubble height (cutting bar) is too high, too low or correct for the cut material length. The stubble height signal may be compared to a predetermined maximum value to provide the maximum stubble height limit. This limit as well as the stubble to crop ratio may be made adjustable.

Figure 7:
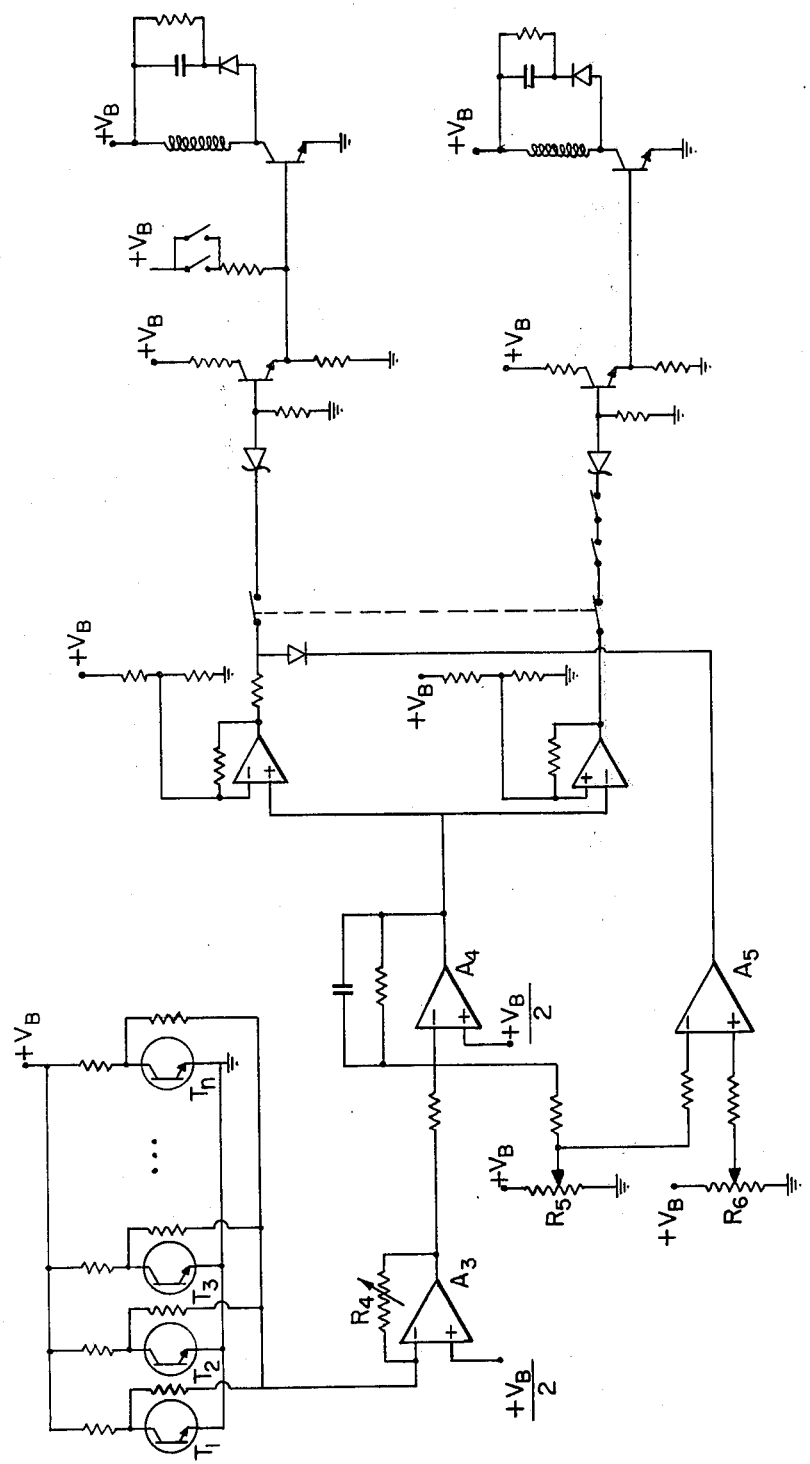
FIG. 7 is a schematic diagram of an electrical circuit adapted for the cut crop length indicating means of FIGS. 5 and 6.

The electrical circuit for such a controller is illustrated in FIG. 7. The phototransistors $T_1$ to $T_n$ are turned on when receiving the emitted light signal. The falling cut crop interrupts the light signal to one or more of the phototransistors turning them off. Each phototransistor turned off increases the signal to amplifier $A_3$. The number of phototransistors turned off indicates the length of the cut crop. Potentiometer $R_4$ allows adjustment of the magnitude of the cut material length signal to provide adjustment of the stubble height to crop height ratio. Potentiometer $R_5$ indicates the cutter bar position and stubble height. Amplifier $A_4$ compares the cut material length signal and the stubble height signal. The feedback resistor and capacitor of $A_4$ filters the comparison signal. The remainder of the circuit performs as previously described with reference to FIG. 3. Potentiometer $R_6$ provides adjustment of the maximum stubble height limit. Amplifier $A_5$ compares the setting of $R_6$ with the stubble height as indicated by $R_5$. When the stubble height is less than the maximum stubble height limit, the output of $A_5$ is high and does not interfere with the normal operation of table-raising circuit. When the maximum limit is exceeded, the output of $A_5$ goes low and inhibits the operation of the raise circuit, preventing the table from being raised.

It will be understood that the control of the present invention may take the form of an attachment to an existing swather or be an integral part of a newly designed swather.

What is claimed is:

1. A height control for a crop harvesting implement having a vertically adjustable table with a cutting bar for cutting off crop material and leaving stubble, said height control comprising:
   a. sensing means disposed behind the cutting bar for indicating the length of the crop material cut by the cutting bar;
   b. means for sensing the position of the cutting bar to provide an indication of the height of the stubble;
   c. means for determining if the indicated stubble height corresponds with a preselected relationship to the indicated length of cut crop material; and
   d. means responsive to deviations from the preselected relationship for adjusting the cutting bar height to establish the preselected relationship.

2. The height control of claim 1 further comprising means to prevent lowering of the cutting bar below a preselected minimum level.

3. The height control of claim 1 further comprising means to prevent raising of the cutting bar above a preselected maximum level.

4. The apparatus of claim 1 wherein the means for sensing the position of the cutting bar comprises means for sensing the position of the table relative to a fixed portion of the implement.

5. The apparatus of claim 1 wherein the cut crop length sensing means comprises radiation emitting means disposed behind the cutting bar on one side of the table, and a series of radiation detecting elements disposed behind the cutting bar on the other side of the table.

6. The apparatus of claim 5 further comprising means responsive to the number of detecting elements receiving signals interrupted by falling cut crop wherein the number of detecting elements receiving interrupted signals is determined by the length of cut crop.

7. The height control of claim 1 further comprising filtering means for reducing the number of adjustments of cutting bar height.

8. A height control for a crop harvesting implement having a vertically adjustable cutting bar, said height control comprising:
   a. cut crop length sensing means disposed behind the cutting bar, said sensing means being movably mounted and interconnected with the cutting bar such that the distance of the sensing means from the cutting bar varies in response to changes in vertical position of the cutting bar relative to the implement in accordance with a preselected relationship;
   b. said sensing means comprising first and second sensing elements, the first sensing element adapted to indicate that the cut crop length is greater than a preselected value, and the second sensing element adapted to indicate that the cut crop length is less than a preselected value;
   c. means responsive to activation of the first sensing element for raising the cutting bar, and means responsive to non-activation of the second sensing element for lowering the cutting bar when the first sensing element is not simultaneously activated;
   d. cutting bar ground proximity sensing means comprising third and fourth sensing elements, the third sensing element adapted to indicate minimum desired cutting bar height, the fourth sensing element adapted to indicate a cutting bar height less than the desired minimum;
   e. means responsive to activation of the third sensing element to prevent response to the second sensing element thereby preventing further lowering of the cutting bar and means responsive to activation of the fourth sensing element to raise the cutting bar.

9. The height control of claim 8 further comprising a fifth sensing element adapted to indicate that the vertical height of the cutting bar is greater than a preselected maximum height and means responsive to activation of said fifth sensing element to prevent further raising of the cutting bar.

* * * * *